US012764765B2

(12) United States Patent
Han et al.

(10) Patent No.: US 12,764,765 B2
(45) Date of Patent: Oct. 13, 2026

(54) METHOD, APPARATUS AND NON-TRANSITORY COMPUTER-READABLE STORAGE MEDIUM FOR SCHEDULING RESOURCES FOR MULTICAST SERVICE

(71) Applicant: Nanning FuLian FuGui Precision Industrial Co., Ltd., Nanning (CN)

(72) Inventors: Lu Han, Shenzhen (CN); Da Liu, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 254 days.

(21) Appl. No.: 18/760,021

(22) Filed: Jul. 1, 2024

(65) Prior Publication Data

US 2025/0254707 A1 Aug. 7, 2025

(30) Foreign Application Priority Data

Feb. 6, 2024 (CN) ......................... 202410172059.2

(51) Int. Cl.
*H04W 72/30* (2023.01)
*H04L 12/18* (2006.01)

(52) U.S. Cl.
CPC ......... *H04W 72/30* (2023.01); *H04L 12/1881* (2013.01)

(58) Field of Classification Search
None
See application file for complete search history.

(56) References Cited

U.S. PATENT DOCUMENTS 11,646,829 B2 * 5/2023 Tseng .................... H04L 1/1812 370/329
2018/0097679 A1 * 4/2018 Zhang ................. H04L 27/2607
2022/0322419 A1 * 10/2022 Jeon .................. H04W 72/0446
2022/0369411 A1 * 11/2022 Agiwal ................. H04L 5/0053
2022/0408226 A1 * 12/2022 Fehrenbach ............ H04W 4/08
2023/0112465 A1 * 4/2023 Vadapalli .............. H04W 76/15 370/329
2023/0225005 A1 * 7/2023 Park ...................... H04W 76/27 370/329
2023/0345509 A1 * 10/2023 Kadiri ................... H04W 72/30
2023/0371046 A1 * 11/2023 Babaei .............. H04W 72/0457
2023/0379945 A1 11/2023 Zhang et al.
2024/0214988 A1 * 6/2024 Shrivastava .......... H04W 76/27
2024/0244643 A1 * 7/2024 Sharma ............. H04W 72/0453
2025/0227804 A1 * 7/2025 Fujishiro ............... H04W 76/27

FOREIGN PATENT DOCUMENTS

CN 101640846 A 2/2010
CN 113630871 A 11/2021
TW 202106059 A 2/2021

* cited by examiner

*Primary Examiner* — Phirin Sam
(74) *Attorney, Agent, or Firm* — ScienBiziP, P.C.

(57) ABSTRACT

A method, a device and a non-transitory computer-readable storage medium for scheduling resources for multicast services, the method comprising: performing packet detection for data of a multicast service received from a network-side device. If the data has a relatively stable packet size at the time of detection and is characterized by periodicity, the multicast scheduling mode is initiated for the user equipment where the multicast group corresponding to the multicast service is located.

8 Claims, 3 Drawing Sheets

METHOD, APPARATUS AND NON-TRANSITORY COMPUTER-READABLE STORAGE MEDIUM FOR SCHEDULING RESOURCES FOR MULTICAST SERVICE

FIELD

A method, apparatus and non-transitory computer-readable storage medium for scheduling resources for multicast service.

BACKGROUND

To support the point-to-multipoint (PTM) transmission of the multicast broadcast service (MBS) in fifth generation (5G) communication networks, the Rel-17 published by 3GPP introduces two new logical channels for the new radio (NR), MBS point-to-multipoint traffic channel (MTCH) and MBS control channel (MCCH). The MTCH is used to transmit MBS data and MCCH is used to transmit MBS control information. Both the MTCH and MCCH logical channels are mapped onto the DL-SCH and finally onto the PDSCH.

With the development of 5G and 5.5G, there are more and more multicast groups in many industrial application scenarios, and it is necessary to realize resource allocation for 5G users of multicast groups based on existing protocols.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
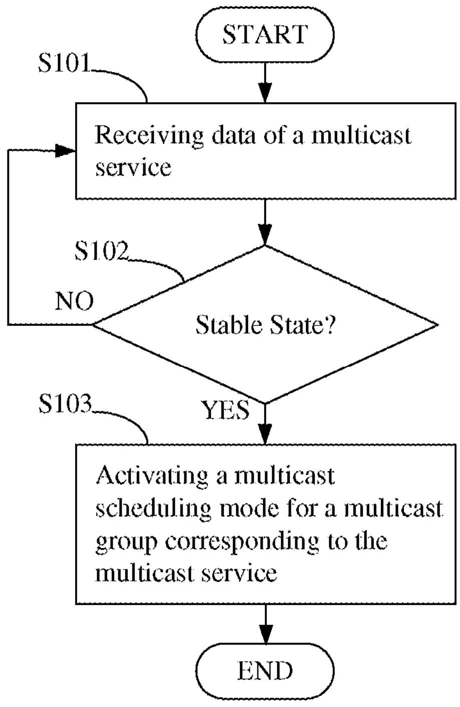
FIG. 1 is a flow chart of one embodiment of a method for scheduling resources for multicast service of the present disclosure.

FIG. 1 is a flow chart of a method for scheduling resources for multicast service of one embodiment. The method for scheduling resources the multicast service may be applied to a network device, and the network device may communicate with a user equipment located within the coverage area. It should be noted that the embodiments of the present invention do not further limit the network device. In this embodiment, the network device may be an LTE base station accessing a Long Term Evolution (LTE) system, may be a 5G NR base station, or may be a wireless controller in a cloud radio access network (CRAN).

In this embodiment, the method for scheduling resources for a multicast service comprises the following steps:

Step S101, receiving data of a multicast service that is sent from a network-side device.

The data of the multicast service is sent by a network-side device of a core network function or a source network-side device for a user equipment.

Step S102, determining whether the multicast service enters a stable state based on the data.

If it is determined that the multicast service has entered the stable state, the step S103 is performed; if it is determined that the multicast service has not entered the stable state, the step S101 is returned to, the data for the multicast service sent by the network-side device is continuously received, and the determination of the step S102 is performed.

Specifically, the multicast service is determined whether to enter the stable state based on sizes of packets of the data and the time intervals between the packets. The time intervals between the packets are the time intervals between each packet and the previous received packet, and for the first packet, its time interval is set to zero by default.

In one embodiment, a packet information queue can be maintained for performing the stable state determination. For example, a packet information queue is maintained to record packet information for a default number of recently received packets. The packet information includes packet length information and information about the time interval between an incoming packet and a previous packet.

When the difference between the packet size of the incoming packet and the packet filtering value are both within the range of positive and negative standard deviations, the multicast service is determined to be in the stable state.

Specifically, the initial assignment of the packet filtering value is the size of the first packet to be filtered. Filterd_PktSize=(1−Pkt_alpha)×Filterd_PktSize+Pkt_alpha×PktSize, where PktSize is the size of a most recently received packet, Pkt_alpha is the packet filtering coefficient, which is set to 0.1 by default, and Filterd_PktSize is the latest packet filtering value. When the multicast service is determined to have entered a stable state, the average packet size in the queue is set to the packet filtering value for subsequent determination of the non-stable state.

In one embodiment, when the MAC layer is notified of entry into the stable state, the MAC layer is also notified of the size of the largest packet in the packet information queue, PMax. After the MAC layer receives the PMax, the transmission block size of the multicast group is recorded as the PMax.

If the most recent packet time intervals have the characteristics of periodic time intervals, the multicast service is determined to enter the stable state. For example, if the incoming packet time intervals are all in the range ([−GroupJitter: +Group Jitter]+semiPersistSchedInterval), the incoming packet time interval is determined to have the characteristic of periodic time intervals and the multicast service enters the stable state. Where the GroupJitter is the delay jitter tolerated by the multicast group and the semiPersistSchedInterval is the semi-static persistent scheduling (SPS) transmission interval.

Step S103, activating a multicast scheduling mode for a multicast group corresponding to the multicast service.

In particular, a scheduling message is transmitted to the user equipment of the multicast group via a multicast broadcast mode, the content of the scheduling message including specified transmission time intervals that the network device uses to transmit physical downlink control channel (PDCCH) information scrambled using a group wireless network temporary identifier (G-RNTI). The multicast broadcast message can cause the receiving user equipments to use the scheduled wireless resources to receive multicast service data every scheduling cycle, and the network device need not transmit the PDCCH information to specify the scheduled wireless resources.

In one embodiment, to avoid collision of retransmitted data and new data, the user equipment can preset an offset value by which the multicast group scheduling transmission interval is corrected. The specific correction time can be based on a preset number of effective times, wherein the preset number of effective times is a default number of effective times of the multicast group scheduling message.

In one embodiment, the offset value and the preset number of effective times can also be set by the network device via the scheduling message.

In one embodiment, after the step S103, the method further continuously determines whether the multicast service is still in the stable state. If it is determined that the multicast service is not in a stable state, the normal scheduling mode is restored for the multicast group corresponding to the multicast service.

In one embodiment, the layers of the radio interface protocol between the network device and the terminal are divided into a first layer (L1), a second layer (L2), and a third layer (L3). The L1 belongs to the physical (PHY) layer and uses physical channels to provide information transmission services, and the PHY layer may include a variety of logical channels, including physical downlink control channels (PDCCH) and physical downlink shared channels (PDSCH). The L2 is responsible for the connections between the network device and the user equipments through the physical layer. In various embodiments, the L2 can include a media access control (MAC) sublayer, a radio link control (RLC) sublayer, a packet data convergence protocol (PDCP) sublayer, and a service data adaptation protocol (SDAP) sublayer, each of which forms a logical link that terminates at the network device. The L3 is used to control the radio resources between the network device and the user equipment and includes a radio resource control (RRC) sublayer. To implement PDCCH resource allocation for multicast groups, a corresponding design is required at the L3 and the L2, which can be implemented in software executed by one or more processors of the network device.

First, the multicast group resource allocation list (GroupResList) is maintained at the L3, and the available wireless resources are allocated to the multicast group according to the multicast group resource allocation list. Specifically, the PDCCH resource allocation for the multicast group is performed as follows.

(1) Maintaining the length of the PDCCH available resources for the multicast group (GroupPerTTI) and the starting available code channel number of the PDCCH for the multicast group.

(2) Sequentially arrange the multicast group PDCCH available code channels according to the existing allocation, group the arranged PDCCH static code channels according to a default number, and number them sequentially. In one example, the default number is a group of 4. When grouping into groups of 4, it is possible that the length of the queue is not divisible by 4. In the case where the length of the queue is not divisible by 4, the remaining code channels that are not divisible by 4 are grouped into groups of 4 with the top code channels in the queue.

(3) Interleaving the numbered groups, i.e., write by row, read by column. Continue with the above example, for example, the number of columns is 3, the number of rows are determined according to the number of groups.

(4) Recording the number of multicast groups assigned to each resource grouping, and every time a new multicast group is assigned, the resource grouping with the lowest number of multicast groups is given priority. If there is more than one multicast group with the lowest number of multicast groups assigned, select the top group in order of group number and record it in the multicast group resource allocation list (GroupResList).

(5) The length of the multicast group PDCCH available resources (GroupPerTTI) and the multicast group PDCCH starting available code channel number are sent down to the L2, and the multicast group resource allocation list (GroupResList) is also sent down to the L2.

The number of code channels to be supported by the multicast group can be configured with multicast group static resources (SR) according to a preset number of multicast groups to be supported (e.g., 128 groups by default).

In one embodiment, the multicast group PDCCH and static resources are used in a shared resource block (RB) manner, and the maximum number of multicast groups supported by each TTI can be calculated according to the following formula GroupPerTTI=min (ceil (GroupNum/SubFrame), total number of code channels−number of code channels of SR), where SubFrame is a subframe.

Next, specific code channels are allocated for the multicast group and a bitmap is maintained at L2, and the PDCCH resource allocation for the multicast group is specifically performed as follows.

(1) L2 generates the bitmap after receiving the scheduling data from L3, including the length of PDCCH available resources (GroupPerTTI) and the starting available code channel number of the multicast group.

(2) A copy of each TTI within a multicast group scheduling cycle is made, and each subframe maintains a multicast group resource bitmap with each code channel initially available in the bitmap.

(3) When a multicast group must perform multicast group activation in the current subframe, determine if there are free code channels in the GroupResList assigned to the multicast group in the multicast group PDCCH bitmap maintained for the subframe. If there is a free code channel, a free code channel is randomly selected as the specific code channel to be used by this multicast group. After the code channel is selected, the bitmap is updated to mark the already occupied code channel.

When a multicast group is deactivated, the PDCCH resources occupied by the multicast group are released and the bitmap of the corresponding activated subframe is updated.

When a multicast group is reactivated, if it is in the same subframe as the previous activation, the original PDCCH resources are used directly. If it is not in the same subframe, the PDCCH resources occupied by the original activated subframe are released and the bitmap is updated at the same time as the reactivation, and the bitmap of the reactivated subframe should be updated at the same time.

Figure 2:
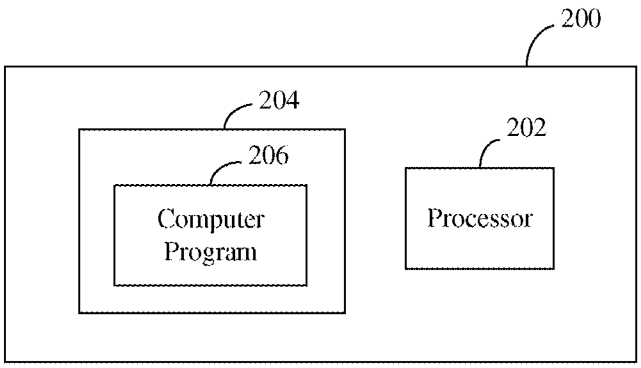
FIG. 2 is a block diagram of one embodiment of an apparatus for scheduling resources for multicast service of the present disclosure.

FIG. 2 is a block diagram of an apparatus 200 for scheduling resources for multicast service. The apparatus 200 includes a processor 202, a memory 204, and a computer program 206, wherein the apparatus 200 is a network device. It should be appreciated by those skilled in the art that the composition of the apparatus 200 shown in FIG. 2 is not a limitation of the embodiments of the present invention, and that the apparatus 200 shown in FIG. 2 is simplified for ease of description, and in different embodiments may include a composition of fewer or more components than shown.

In one embodiment, the processor 202 may comprise integrated circuits, e.g., it may comprise a single packaged integrated circuit, or it may comprise a plurality of integrated circuits packaged for the same function or for different functions, including one or more central processing units (CPUs), microprocessors, digital processing chips, graphics processors, and a combination of various control chips, and so on. The processor 202 is the control core (control unit) of the apparatus 200 and uses various interfaces and circuits to connect various components of the entire apparatus 200 to perform various functions of the apparatus 200 and process data by running or executing a computer program 206 or module stored in the memory 204 and retrieving data stored in the memory 304, such as the method for scheduling resources for multicast service.

In one embodiment, the memory 204 is used to store the code of a computer program 206 and various data, such as the method for scheduling resources for multicast service, and to enable high-speed, automatic completion of access to the program or data during operation of the device 200. The memory 204 includes read-only memory (ROM), programmable read-only memory (PROM), erasable programmable read-only memory (EPROM), one-time programmable read-only memory (OTPROM), electrically erasable programmable read-only memory (EEPROM), compact disc read-only memory (CDR), and read-only memory (ROM). (EEPROM), Compact Disc Read-Only Memory (CD-ROM) or other optical disk memory, magnetic disk memory, magnetic tape memory, or any other computer-readable storage medium that can be used to carry or store data.

Figure 3:
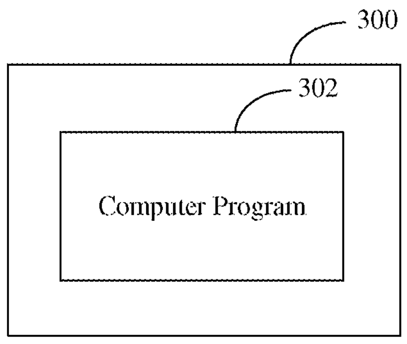
FIG. 3 is a block diagram of one embodiment of a non-transitory computer-readable storage medium for scheduling resources for multicast service of the present disclosure.

FIG. 3 is a block diagram of a non-transitory computer-readable storage medium 300 for scheduling resources for multicast service. As shown in FIG. 3, the non-transitory computer-readable storage medium 300 stores a computer program 302 that, when executed by a processor, implements the method for scheduling resources for multicast service.

In summary, the method, apparatus and non-transitory storage medium for scheduling resources for multicast service can improve the multicast reception experience of the user equipment and, at the same time, reduce the overall power consumption of the NR system by saving the overhead of the PDCCH.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method for scheduling resources for multicast service, the method being performed on a network device and the method comprising:

receiving data of a multicast service that is sent from a network-side device;

determining, based on the data, whether the multicast service enters a stable state, wherein determining, based on the data, whether the multicast service enters a stable state comprises determining whether the multicast service enters a stable state based on sizes of packets of the data and time intervals between the packets, and determining that the multicast service enters the stable state when a difference between the sizes of the packets and a packet filtering value are both within a range of positive and negative standard deviations; and activating a multicast scheduling mode for a multicast group corresponding to the multicast service when the multicast service is determined to enter the stable state.

2. The method of claim 1, wherein the packet filtering value is calculated as:

packet filtering value=(1−Pkt_alpha)×Filterd_PktSize+Pkt_alpha×PktSize, wherein PktSize is a size of a most recently received packet, Pkt_alpha is a packet filtering coefficient, which is set to 0.1 by default, and Filterd_PktSize is a latest packet filtering value initially assigned as a packet size of a firstly received packet.

3. The method of claim 1, wherein the determining whether the multicast service enters a stable state based on sizes of packets of the data and time intervals between the packets comprises:

determining that the multicast service enters a stable state when the time intervals are periodic.

4. The method of claim 1, wherein the method further comprises:

continuously determining whether the multicast service is still in the stable state; and restoring the multicast group corresponding to the multicast service to a normal scheduling mode when determining that the multicast service is not in the stable state.

5. The method of claim 1, wherein the activating a multicast scheduling mode for a multicast group corresponding to the multicast service when the multicast service is determined to enter the stable state comprises:

transmitting a scheduling message to user equipment of the multicast group via a multicast broadcast method, wherein the scheduling message comprising specified transmission time intervals that the network device uses to transmit physical downlink control channel (PDCCH) information scrambled using a group wireless network temporary identifier (G-RNTI), wherein the PDCCH information comprising wireless resources scheduled for the user equipment for the multicast service.

6. The method of claim 5, wherein the activating a multicast scheduling mode for a multicast group corresponding to the multicast service when the multicast service is determined to enter the stable state further comprises:

enabling the user equipment to use the wireless resources to receive the data for the multicast service.

7. An apparatus configured for scheduling resources for multicast service, the apparatus comprising:

a memory storing processor-executable instructions; and at least one processor coupled to the memory to receive the processor-executable instructions, wherein, upon execution of the processor executable instructions, the at least one processor:

receiving data of a multicast service that is sent from a network-side device;

determining, based on the data, whether the multicast service enters a stable state, wherein determining, based on the data, whether the multicast service enters a stable state comprises determining whether the multicast service enters a stable state based on sizes of packets of the data and time intervals between the packets, and determining that the multicast service enters the stable state when a difference between the sizes of the packets and a packet filtering value are both within a range of positive and negative standard deviations; and activating a multicast scheduling mode for a multicast group corresponding to the multicast service when the multicast service is determined to enter the stable state.

8. A non-transitory computer readable storage medium storing processor-executable instructions which, when executed by at least one processor, cause the at least one processor to perform a method for scheduling resources for multicast service, the method comprising:

receiving data of a multicast service that is sent from a network-side device;

determining, based on the data, whether the multicast service enters a stable state, wherein determining, based on the data, whether the multicast service enters a stable state comprises determining whether the multicast service enters a stable state based on sizes of packets of the data and time intervals between the packets, and determining that the multicast service enters the stable state when a difference between the sizes of the packets and a packet filtering value are both within a range of positive and negative standard deviations; and activating a multicast scheduling mode for a multicast group corresponding to the multicast service when the multicast service is determined to enter the stable state.

* * * * *